United States Patent [19]

Spry et al.

[11] 3,715,347
[45] Feb. 6, 1973

[54] PROCESS FOR ACETYLATION

[75] Inventors: Douglas O. Spry, Indianapolis; Ian G. Wright, Greenwood, both of Ind.

[73] Assignee: Eli Lilly and Company, Indianapolis, Ind.

[22] Filed: Nov. 6, 1970

[21] Appl. No.: 87,634

[52] U.S. Cl..............260/239.1, 260/243 C, 424/271
[51] Int. Cl. .......................C07d 99/16, C07d 99/24
[58] Field of Search .......................260/239.1, 243 C

[56] References Cited

UNITED STATES PATENTS 3,502,665  3/1970  Harrow et al.....................260/243 C Primary Examiner—Nicholas S. Rizzo
Attorney—Everet F. Smith and Walter E. Buting

[57] ABSTRACT

6-Aminopenicillanic acid, 3-acetoxymethyl-7-amino-$\Delta^3$-cephem-4-carboxylic acid and 3-methyl-7-amino-$\Delta^3$-cephem-4-car-boxylic acid and esters thereof are reacted with ketene in an aqueous or inert non-aqueous solvent at a temperature between about 5° and about 35° C. to provide the corresponding acetamido derivatives in superior yields. 6-Acetamidopenicillanic acid, 3-acetoxymethyl-7-acetamido-$\Delta^3$-cephem-4-carboxylic acid, 3-methyl-7-acetamido-$\Delta^3$-cephem-4-carboxylic acid and the esters thereof are useful intermediates for the preparation of cephalosporin antibiotics.

4 Claims, No Drawings

PROCESS FOR ACETYLATION

BACKGROUND OF THE INVENTION

Extensive chemical investigation of the penicillin and cephalosporin antibiotics has led to the discovery of newer and more efficacious antibiotics. Key substances in these investigations have been 6-aminopenicillanic acid (6-APA), 3-acetoxymethyl-7-amino-Δ³-cephem-4-carboxylic acid (7-aminocephalosporanic acid, 7-ACA) and 3-methyl-7-amino-Δ³-cephem-4-carboxylic acid (7-aminodesacetoxycephalosporanic acid, 7-ADCA).

Because of the basic character and reactivity of the amino group of 6-APA, 7-ACA and 7-ADCA, chemical modification of these amino acids is commonly carried out after the amino group has been protected or blocked with a suitable protecting group.

One such protecting group which can be used to block the amino group of 6-APA, 7-ACA and 7-ADCA is the acetyl group.

Heretofore, acetylation of 6-APA and the 7-aminocephalosporins to provide the corresponding acetamide derivative has been accomplished by the reaction of an acetyl halide with 6-APA or 7-ACA in the presence of a weak base, such as sodium bicarbonate. While this is generally a satisfactory method, the yields obtained are commonly on the order of 20 percent or less. Because of the high cost of obtaining 6-APA, and especially 7-ACA and 7-ADCA, by fermentation and chemical processes, improved yields in any subsequent chemical reaction which employs these expensive intermediates would represent a significant advantage.

It is an object of the present invention to provide a method for the acetylation of 6-APA, 7-ACA, 7-ADCA and the esters thereof. In particular, it is an object of this invention to provide a method for the preparation of 6-acetamidopenicillanic acid, 7-acetamidocephalosporanic acid, 7-acetamidodesacetoxycephalosporanic acid and certain esters of the foregoing acids which affords these compounds in superior yields.

SUMMARY OF THE INVENTION

This invention relates to a new and useful method for the acetylation of 6-APA, 7-ACA, 7-ADCA and the esters thereof. In particular it relates to a method for the preparation of 6-acetamidopenicillanic acid, 7-acetamidocephalosporanic acid, 7-aminodesacetoxycephalosporanic acid and the esters thereof which comprises the acetylation of 6-APA, 7-ACA and 7-ADCA with ketene.

According to the practice of this invention, ketene gas is reacted with the amino acid or an ester thereof in a suitable solvent at a temperature between about 5° and about 35°C. to provide the corresponding acetamido derivative.

The reaction is carried out by passing ketene gas through a solution or suspension of 6-aminopenicillanic acid, 7-aminocephalosporanic acid, 7-aminodesacetoxycephalosporanic acid or esters of the foregoing amino acids in an aqueous or an inert non-aqueous solvent until an excess of ketene has been passed through the reaction mixture. When the reaction is carried out with the free acid form of the amino acid in an anhydrous solvent such as dry dioxane, both the amino group and the carboxylic acid group react with ketene to provide the mixed anhydride of 6-acetamidopenicillanic acid, 7-acetamidocephalosporanic acid or 7-acetamidodesacetoxycephalosporanic acid and acetic acid as illustrated by the following equation for 6-APA.

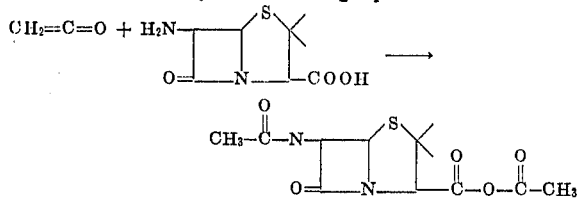

Addition of water to the reaction mixture following the completion of the acetylation reaction results in hydrolysis of the mixed anhydride to yield the free 6-acetamidopenicillanic acid, 7-acetamidocephalosporanic acid or 7-acetamidodesacetoxycephalosporanic acid. Alternatively, if water is present in the reaction mixture during the acetylation with ketene, the acetamido derivative in the free acid form is obtained directly.

The presently disclosed method for preparing the N-acetyl derivatives of 6-APA, 7-ACA and 7-ADCA represents an improvement over previous methods of acetylation in that higher yields are obtained.

DETAILED DESCRIPTION

According to the practice of this invention, the reaction of ketene with a 6-aminopenicillin or a 7-aminocephalosporin represented by the formula

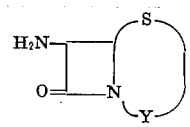

wherein Y is

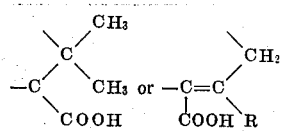

wherein R is methyl or acetoxymethyl, and the alkali and alkaline metal cationic salts or esters thereof provides a 6-acetamidopenicillin or a 7-acetamidocephalosporin represented by the formula

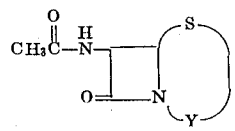

wherein Y has the same meanings as previously assigned.

The reaction is carried out by passing excess ketene gas through a solution or suspension of 6-APA, 7-ACA, 7-ADCA or an ester or salt thereof in an aqueous or non-aqueous inert solvent at a temperature between about 5° and about 35°C.

The ketene reactant is conveniently produced by the pyrolysis of acetone according to the method described by Fieser and Fieser, *Advanced Organic Chemistry*, p. 390, Rheinhold Publishing Co., N. Y., 1962.

Inert non-aqueous solvents which can be employed in the present acetylation method are those solvents which are unreactive towards ketene. For example, ethers such as diethyl ether, dioxane, tetrahydrofuran, the dimethyl ether of ethylene glycol and like ethers; esters such as ethyl acetate, n-propyl acetate, isopropyl acetate, amyl acetate, methyl acetate and like esters; ketones such as acetone, methyl ethyl ketone, methyl isobutyl ketone, diethyl ketone and like ketones, the chlorinated hydrocarbons such as chloroform, methylene dichloride and the like. Although, water reacts slowly with ketene to form acetic acid, it is not essential in the present method to exclude water from the reaction mixture. For example, 6-aminopenicillanic acid is suspended in ethyl acetate and converted to the sodium salt by the addition of 1 N aqueous sodium hydroxide. Ketene gas is passed through the solution of the sodium salt until the pH reaches about pH 5. The fall in pH indicates that acetylation of the amino group is complete and excess ketene is reacting slowly with water to form acetic acid. The pH is then adjusted downward with hydrochloric acid to liberate 6-acetamidopenicillanic acid. The formation of the sodium salt prevents the formation of the mixed anhydride and the drop in pH with passage of excess ketene serves as an indicator for determining when the amino group acetylation has been completed.

The term "aqueous solvent" as used herein refers to water and mixtures of water with water miscible and immiscible solvents.

The reaction is desirably carried out at a temperature below room temperature and generally at ice bath temperatures or lower, depending upon the freezing point of the reaction mixture. The preferred temperature range is about 5° to 15°C.

Acetylation of 6-APA, 7-ACA or 7-ADCA with ketene in an essentially anhydrous solvent such as dry dioxane or dry acetone affords the mixed anhydrides of 6-acetamidopenicillanic acid, 7-acetamidocephalosporanic acid and 7-acetamidodesacetoxycephalosporanic acid with acetic acid. Addition of water to the reaction mixture following the acetylation with ketene effects hydrolysis of the mixed anhydride and provides the desired acetamido derivative as the free acid.

Esters of 6-APA, 7-ACA and 7-ADCA can be employed in the present process if desired. Any suitable ester can be used, however preferred esters are those formed with ester-forming moieties commonly employed as carboxylic acid protecting groups in the antibiotic and amino acid arts and exemplified by benzyl, benzhydryl, p-nitrobenzyl, p-methoxybenzyl, 3,5-dimethoxybenzyl, 2,2,2-trichloroethyl, trimethylsilyl and like carboxylic acid esters.

According to the improved acetylation method of this invention 6-acetamidopenicillanic acid and 7-acetamido derivative of cephalosporanic acid and desacetoxycephalosporanic acid are obtained in yields in excess of 80 percent of the thoretical amount. Heretofore methods of acetylation of 6-APA and 7-ACA have generally provided the acetamido derivatives in yields below about 30 percent and commonly only about 20 percent of the theoretical yield.

The preferred practice of the present invention employs the acetylation of 7-aminocephalosporanic acid and 7-aminodesacetoxycephalosporanic acid with ketene in an essentially anhydrous reaction medium.

In a preferred embodiment of the present invention, 7-aminocephalosporanic acid is suspended in dry dioxane and the suspension is cooled in an ice bath. With vigorous stirring, ketene gas is bubbled through the cold suspension through a fritted glass tube. As the reaction progresses, solution occurs and excess ketene gas is allowed to pass through the solution. The excess ketene is removed in vacuo and water is added to the reaction mixture. The reaction mixture is then warmed to effect hydrolysis of the mixed anhydride. The hydrolyzed reaction mixture is then evaporated to yield 7-acetamidocephalosporanic acid. The product thus obtained can be further purified by recrystallization from a suitable solvent for example, ethyl acetate.

Illustrative of the compounds provided by the present method are 6-acetamidopenicillanic acid, p-nitrobenzyl 6-acetamidopenicillanate, 2,2,2-trichloroethyl 6-acetamidopenicillante, 7-acetamidocephalosporanic acid, p-nitrobenzyl 7-acetamidocephalosporanate, p-methoxybenzyl 7-acetamidocephalosporante, benzyl 7-acetamidodesacetoxycephalosporanate, 2,2,2-trichloroethyl 7-acetamidodesacetoxycephalosporanate, 7-acetamidodesacetoxycephalosporanic acid, t-butyl 6-acetamidopenicillanate, benzhydryl 7-acetamidocephalosporanate and like acids and esters.

The compounds provided by the present invention are useful intermediates for the synthesis of antibiotics of the cephalosporin class. For example, 6-acetamidopenicillanic acid can be converted to the sulfoxide and reacted under the conditions described in U. S. Pat. No. 3,275,626 to provide 7-acetamidodesacetoxycephalosporanic acid.

6-Acetamidopenicillanic acid itself exhibits antibacterial activity as described by U.S. Pat. No. 2,941,995. 7-Acetamidocephalosporanic acid prepared with acetyl chloride and 7-ACA and its microbiological activity are described by British Pat. No. 966,221.

7-Acetamidodesacetoxycephalosporanic acid obtained by the acetylation of 7-ADCA with ketene according to the present method likewise possesses antibiotic acitivity. In the standard agar dilution test 7-acetamidodesacetoxycephalosporanic acid inhibits the growth of *Streptococcus aureus*, *Bacillus subtilis* and *Pseudomonas solanacearum* at minimum inhibitory concentrations of <6.25, 100 and 6.25 mcg./ml. respectively.

7-Acetamidodesacetoxycephalosporanic acid ester can be converted to 3-bromomethyl-7-acetamido-$\Delta^2$-cephem-4-carboxylic acid ester which can be reacted with methyl mercaptan to obtain the 3-methylthiomethyl derivative according to the procedures described by co-pending application Ser. No. 790,886, filed Jan. 13, 1969. The 3-methylthiomethyl-7-acetamido-$\Delta^2$-cephem-4-carboxylic ester can be isomerized to the $\Delta^3$-cephem ester as described in the above designated co-pending application and can then be reacted with phosphorus pentachloride under the conditions described by co-pending application Ser. No. 651,622 filed July 7, 1967, to yield the 3-methylthiomethyl-7-amino-Δ³-cephem-4-carboxylic acid ester. Acylation of the 7-amino-Δ³-cephem ester according to well known acylation procedures provides the desired 7-acylamido-Δ³-cephem ester. For example, 3-methylthiomethyl-7-amino-Δ³-cephem-4-carboxylic acid or an ester thereof can be acylated with the tertbutyloxycarbonyl protected mixed anhydride of phenylglycine formed with methylchloroformate in the presence of triethylamine to provide 3-methylthiomethyl-7-(α-aminophenylacetamido)-Δ³-cephem-4-carboxylic acid or an ester thereof following removal of the t-butyloxycarbonyl protecting group. The above compound is described by Belgium Pat. No. 734,532.

The following examples more fully illustrate the present invention.

EXAMPLE 1

A suspension of 10 g. of 7-aminocephalosporanic acid in 100 ml. of dioxane was cooled in an ice bath and excess ketene gas was bubbled through the suspension with vigorous stirring. A solution was formed and the excess ketene was removed in vacuo. In order to hydrolyze the mixed anhydride, 50 ml. of water was added to the reaction mixture and the mixture was warmed on the steam bath for 15 minutes. The reaction mixture was evaporated on a rotary evaporator to yield a residual paste. The paste was dissolved in 300 ml. of ethyl acetate and the solution was dried over sodium sulfate. The dried ethyl acetate solution was evaporated to a volume of 150 ml. The reaction product, 7-acetamidocephalosporanic acid crystallized from the ethyl acetate and was filtered. Yield 91 percent.

EXAMPLE 2

To a slurry of 4.3 g. of 3-methyl-7-amino-Δ³-cephem-4-carboxylic acid (7-aminodesacetoxycephalosporanic acid) in 250 ml. of ethyl acetate cooled to 10°C. was added dropwise 25 ml. of 1 N sodium hydroxide until a pH of pH 8.3 was attained. Ketene was bubbled through this solution through a fritted glass tube for 30 minutes at which time the pH of the solution had reached pH 5.5. The pH of the mixture was adjusted to pH 2.5 with 1 N hydrochloric acid and the ethyl acetate layer was separated and dried over sodium sulfate. Evaporation of the ethyl acetate layer provided 5.1 g. (83 percent yield) o 3-methyl-7-acetamido-Δ³-cephem-4-carboxylic acid as a white crystalline solid.

The product was further purified by recrystallization from acetone-hexane to yield white needles melting at about 195°–196°C.

Elemental analysis:
Theory: C, 46.88; H, 4.72
Found: C, 46.97; H, 4.86

EXAMPLE 3

To a cold (10°C.) stirred slurry of 86.5 g. of 6-aminopenicillanic acid in 1900 ml. of ethyl acetate, 425 ml. of 1 N sodium hydroxide was slowly added. A solution was obtained with a pH of pH 7.5. Ketene gas was bubbled through the solution in excess and the pH of the solution dropped to about pH 5.3 in 45 minutes. The pH of the reaction solution was adjusted to pH 3.0 by the addition of 370 ml. of 1 N hydrochloric acid and the ethyl acetate layer was separated and dried. Diazomethane was added in excess to the ethyl acetate layer to convert the 6-acetamidopenicillanic acid to the methyl ester. Evaporation of the ethyl acetate solution containing the ester afforded an oily residue of 105 g. of methyl 6-acetamidopenicillanate which on standing crystallized to a white crystalline solid (yield 97 percent.) This layer chromatography of the reaction product on silica gel plates showed one spot material. The nuclear magnetic resonance spectrum and infrared absorption spectrum were in agreement with the structure of the product.

We claim:

1. In the method for preparing a compound of the formula

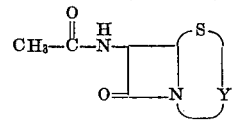

wherein Y is

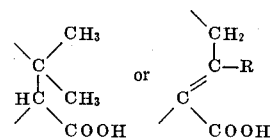

wherein R is methyl or acetoxymethyl and the alkali and alkaline earth metal cationic salts or esters thereof by acetylation, the improvement which comprises reacting a compound of the formula

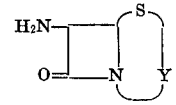

wherein Y has the same meanings described above with ketene in an aqueous or inert non-aqueous solvent at a temperature between about 5° and about 35°C., and when a non-aqueous solvent is employed with the free acid hydrolyzing the mixed anhydride initially produced with water.

2. The method of claim 1 wherein ketene is reacted with 6-aminopenicillanic acid.

3. The method of claim 1 where ketene is reacted with 3-acetoxymethyl-7-amino-Δ³-cephem-4-carboxylic acid.

4. The method of claim 1 wherein ketene is reacted with 3-methyl-7-amino-Δ³-cephem-4-carboxylic acid.

* * * * *